J. N. JACOBSEN.
WRAPPING MACHINE.
APPLICATION FILED JULY 8, 1908.

952,256.

Patented Mar. 15, 1910.
10 SHEETS—SHEET 1.

Fig. 1.

WITNESSES:
John Oller.
C. A. Penfield

INVENTOR.
JENS N. JACOBSEN.
BY Geo. H. Strong
ATTORNEY.

J. N. JACOBSEN.
WRAPPING MACHINE.
APPLICATION FILED JULY 8, 1908.

952,256.

Patented Mar. 15, 1910.
10 SHEETS—SHEET 2.

WITNESSES:
John Olle.
C. Penfield

INVENTOR.
JENS N. JACOBSEN.

BY Geo. H. Strong,
ATTORNEY.

J. N. JACOBSEN.
WRAPPING MACHINE.
APPLICATION FILED JULY 8, 1908.

952,256.

Patented Mar. 15, 1910.
10 SHEETS—SHEET 3.

WITNESSES:

INVENTOR.
JENS N. JACOBSEN.

BY

ATTORNEY.

UNITED STATES PATENT OFFICE.

JENS N. JACOBSEN, OF EUREKA, CALIFORNIA, ASSIGNOR TO INTERNATIONAL WRAPPING MACHINE COMPANY, OF EUREKA, CALIFORNIA, A CORPORATION OF CALIFORNIA.

WRAPPING-MACHINE.

952,256.   Specification of Letters Patent.   Patented Mar. 15, 1910.

Application filed July 8, 1908. Serial No. 442,570.

*To all whom it may concern:*

Be it known that I, JENS N. JACOBSEN, citizen of Germany, residing at Eureka, in the county of Humboldt and State of California, have invented new and useful Improvements in Wrapping - Machines, of which the following is a specification.

My invention relates to wrapping machines, and pertains especially to a machine for wrapping solid substances, such as butter, soap, and the like.

The invention consists of the parts and the construction and combination of parts as hereinafter more fully described and claimed, having reference to the accompanying drawings, in which—

Fig. 5ª is a plan of the cutter. Fig. 21ª is a similar view, with knife closed.

A represents the framework of my machine, which framework is of suitable size, shape and construction.

The butter or other material to be packaged or wrapped and cut into suitable cakes or squares is arranged on the slatted endless carrier 2. This carrier operates in horizontal planes, and passes over suitable sprockets 3—3'. This carrier is given intermittent motion by suitable mechanism operated from the drive-shaft 4, Figs. 1; 2 and 3. As here shown, the step by step movement of the carrier 2 is effected by a ratchet 5 of sprocket 3, and a pawl 6 pivotally mounted on a lever 7, which lever is hung to swing on said sprocket. A link 8 connects the lever 7 with a lever arm 9 which is rigidly attached to a rock shaft 10. The rock shaft 10 has an operating rigid arm 11, to which is connected a link 12 extending back to a yoke 13 carried by the lever 14, which is fulcrumed to the frame at 15. The yoke 13 has a longitudinal guide 16 engaging a crank 17 on a shaft 18. Shaft 18 is driven constantly from drive-shaft 4 through the medium of the intermeshing gears 19—20. Shaft 4 is operated from any suitable source of power connecting with the band pulley 21. Thus at each revolution of shaft 4 the carrier 2 moves forward one step and carries the square of butter, or other material to be wrapped, over the forward incline of the carrier and against a spring-actuated, pivoted, yieldingly-mounted stop plate 22, Figs. 1, 11, 13 and underneath a curved top guide plate 22'. This stop plate 22 is pivoted at its ends adjacent to its lower edge, and performs the double function of preventing the butter rolling off over the forward end of the carrier 2, and subsequently of bridging the gap between the carrier and a pocket 23 of the wheel 24, and thereby forming an inclined support over which the square of butter is pushed from the carrier into the pocket in a manner shortly to be described.

Figures 27, 28, 29, 30, 31, 32:
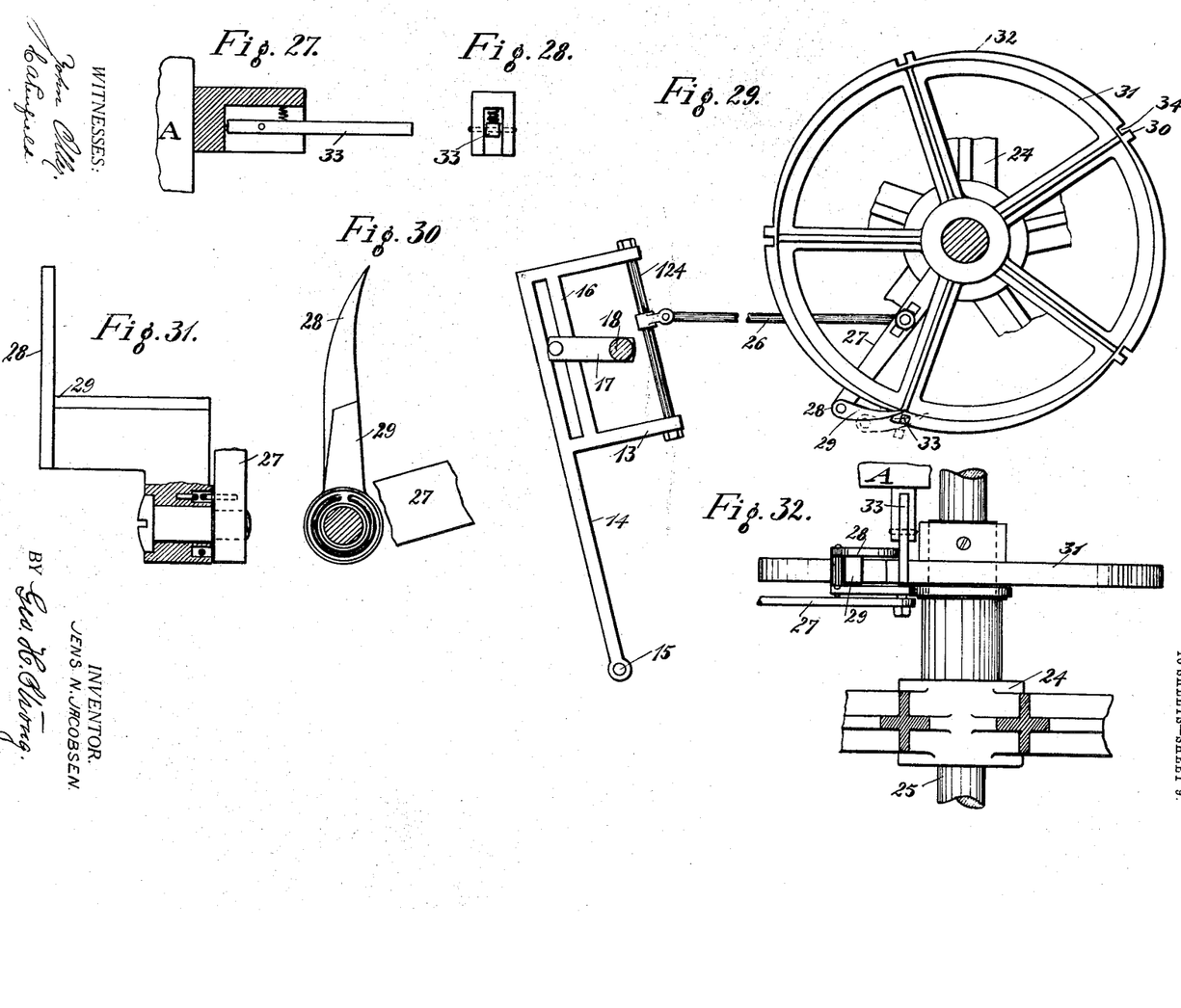
Fig. 27 is a detail of the disk latch of Fig. 30.
Fig. 28 is an end view of same.
Fig. 29 is an elevation of the means for revolving the mold wheel.
Fig. 30 is a detail of the finger for operating the latch of Fig. 27.
Fig. 31 is a plan of the latch of Fig. 30.
Fig. 32 is a plan in partial section of the mechanism of Fig. 29.

The carrier wheel 24 turns loose on a stationary horizontal shaft 25, and there is any suitable number of pockets 23 arranged around the periphery of the wheel. As here shown, there are five of these pockets, because that is the number which practice has shown to give the best results. The wheel turns in a vertical plane and it is given a step by step movement by any suitable means. As here shown, the step by step movement is effected from the yoke 13, Fig. 29, by means of a connecting rod 26 pivoted to the lever 27, Figs. 29 and 32, which lever is fulcrumed to turn freely about the hub of wheel 24. The outer end of the lever 27 carries a spring-actuated finger 28 which has a shoulder portion 29 to engage a tooth 30 on the periphery of the disk 31, which latter is fixed to the hub of the wheel 24. At each complete forward movement of the lever 27, finger 28 rides under a latch 33, and lifts it to release the disk 31, while the shoulder 29 engages a tooth 30 on the disk 31 to turn the wheel 24 one step. The periphery of the disk is made in the form of a series of eccentric segments 32, Fig. 29, in such fashion that a spring-actuated hinged latch 33 pivoted to a fixed part of the frame will ride over the perimeter of the disk and drop into a notch 34 close to a tooth 30 at the end of each forward movement of the wheel, and temporarily lock the wheel against any further movement. This spring latch 33, or detent, Fig. 27, is lifted on the next forward movement of the finger 28, by the finger 33 riding under the latch and lifting the latter just prior to the engagement of the shoulder 29 with the tooth 30. This serves to lift the latch over the tooth and allow the wheel to revolve.

Figures 11, 12, 13, 14, 15:
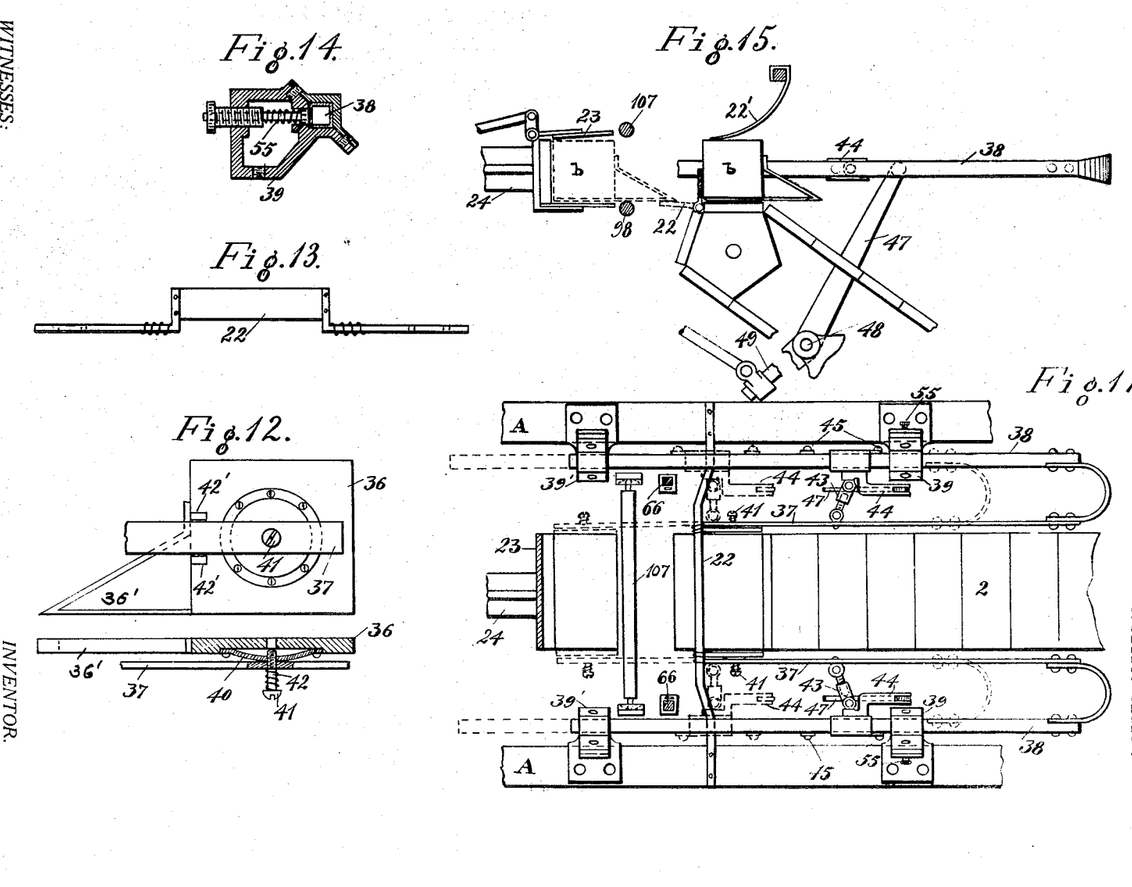
Fig. 11 is a plan of the portion of the apparatus for feeding the butter into the pockets.
Fig. 12 is a detail of one of the gripping devices of Fig. 11.
Fig. 13 is a detail of the spring stop plate.
Figs. 14 and 15 are details of the brake mechanism for the butter carrier slides.

The cube of butter or other article to be packaged, and which is herein represented by the character $b$, after it is deposited by the carrier 2 against the spring stop plate 22, is grasped at the ends by two yieldingly-supported clamp members 36 carried on the spring arms 37, which latter are curved outwardly at their upper ends and attached to a sliding frame 38. This frame 38 consists of two bars slidably mounted in suitable guides 39—39' on a fixed part of the frame A and arranged to operate at an incline, and the grippers 36 are adapted to grasp the square of butter endwise and move the same from off the carrier 2 and into a pocket 23; the movements of the various parts of the machine being so timed that the wheel 24 will be stopped each time a pocket 23 is directly in the path of the article which is gripped by the clamp members 36 of the carrier 38. The construction of these clamp members 36 is shown in Fig. 12, in which a convex plate 40 on a clamp 36 receives a screw 41 passing through a perforation in the arm 37. A spring 42 is interposed between the head of the screw 41 and the arm 37 and serves to hold the parts in position; while the convexed plate 40 forms a rocking bearing to enable the clamp 36 to adjust itself squarely to the end of a cube of butter. Lugs 42' limit the turning movement of a gripper 36.

Figures 33, 34, 35, 36:
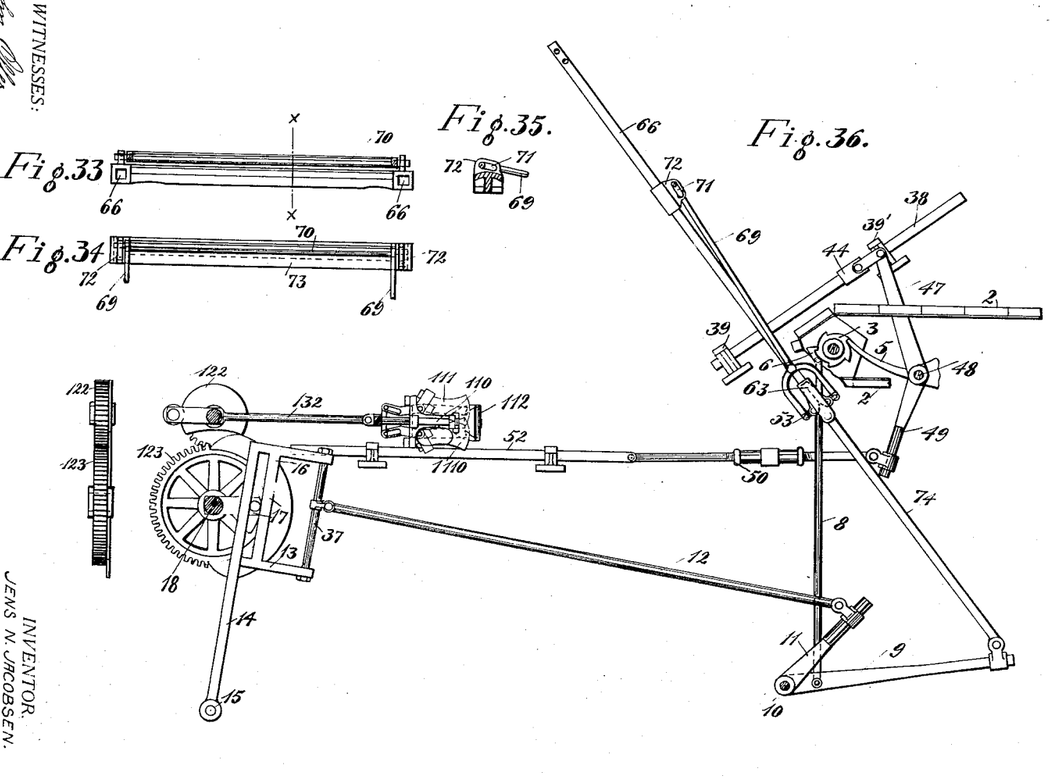
Figs. 33 and 34 are details of the wrapper gripper.
Fig. 35 is a section on *x—x* of Fig. 33.
Fig. 36 is an elevation of the gripping mechanism.

The opening and closing of the clamps 36 is effected synchronously with the reciprocation of the frame 38 by the following means: Each arm 37 is pivotally connected by a link 43 to a sliding bracket 44 which has a limited movement lengthwise of each of the side rails of the carriage 38 between fixed stops 45 on said side rails. Each bracket 44 pivotally connects to a lever arm 47 rigid on rock shaft 48, Figs. 1, 36. This rock shaft 48 carries the downwardly projecting arms 49 which connect by links 50, at 51, with the slides 52, which latter carry the end folding devices 110—111—112, hereinafter to be described.

Figures 8, 9, 10:
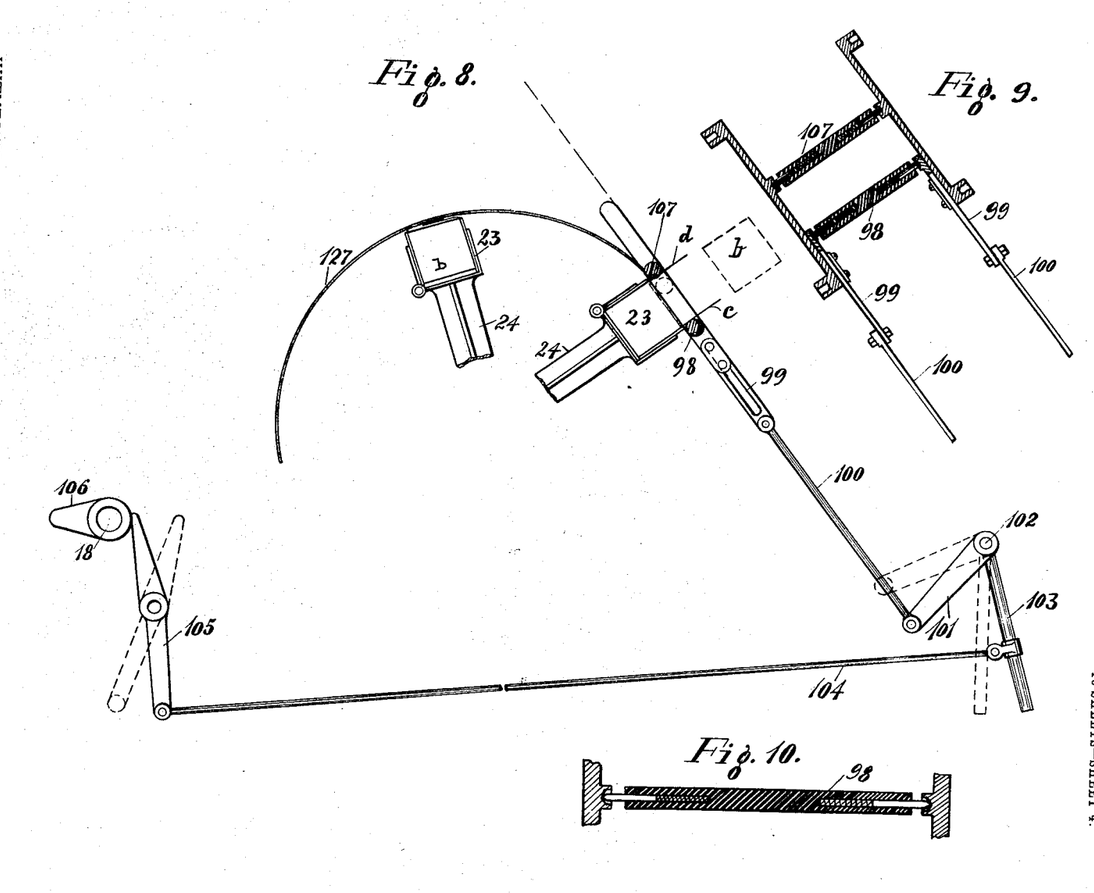
Fig. 8 is a diagrammatic view of the side folder and operating means therefor.
Fig. 9 is a plan in partial section of said side folder.
Fig. 10 is an enlarged detail showing a side folding roller in partial section.

The operation of the carrier 38 and clamp members 36 is as follows: On the oscillation of the rock shaft 48 in one direction the brackets 44 first move downward slightly, sliding on the side bars of the frame 38, the latter remaining stationary against the operation of a suitable friction device, as the spring-pressed pins 55, Fig. 14. In these initial independent movements of the brackets 44, the toggle arms 43 are operated to press inwardly the clamps 36 and grasp any article which is disposed between them. This inward movement of the clamps 36 toward each other continues until the brackets 44 slide down the side rails of the frame 38 and encounter the lowermost stops 45, whereupon the whole frame 38, with the clamps 36 and the object to be wrapped between them, is moved forward and downwardly, thereby turning the plate 22 from a vertical position into a horizontal one, as indicated in Fig. 15, and the object $b$ to be wrapped is carried off the carrier 2 across the plate 22 and into the pocket 23. The clamps 36 each have a rearwardly extending heel-piece 36' which slides over the plate 22 when pushed down into inclined position, as shown in Fig. 8, and maintains the same depressed while the cube $b$ is being put into the pocket.

Synchronously with the operation of the machine and the stoppage of one of the pockets or boxes 23 at the receiving point immediately in advance of the carrier 38, a sheet of paper, cloth, or other wrapping material is moved across the pocket and between the latter and the advancing cube of butter, the sheet being severed at the proper length, and when the butter moves into the pocket it carries the severed wrapper along with it, leaving a portion of the wrapper projecting sufficiently on all sides for folding purposes. The wrapper-forming material is preferably in the form of a continuous strip, represented at 60, and wound upon a roll 61 carried on an extension bracket 62 of the frame. The strip 60 passes through the frame 38 substantially at right angles to a line of reciprocation of the frame and proximate to the receiving pocket 23. The strip is adapted to be grasped at the lower end by a pair of grippers 63, Figs. 4—5—6—7; these grippers each comprising a pair of hinged jaws which are pivoted at 64 to a bracket 65 which is free to slide on the fixed guide 66. Each jaw member 63 has an outwardly extending arm 67, and these arms 67 of each pair of grippers connect with a yoke 68, which latter connects with a rod 69 extending upward and connecting with a grip plate 70. This plate 70, more clearly indicated in Figs. 33, 34 and 35, has its ends sliding in the inclined slots 71 in the brackets 72, which are free to move up and down on the stationary guide 66. These brackets 72 carry a plate 73, which latter coöperates with the sliding gripper plate 70 to grasp the strip of wrapping material 60 which is passed between the plates 70 and 73. The actual gripping and pulling of the paper from the roll 61 is done by the gripper members 70—73 which are always above the pocket and above the cutting knife 75, while the function of the lower grippers 63 is merely to engage the edge of the paper and pull the same across the pocket and hold it taut without gripping it very tightly. It is understood that pushing up on the plate 70 and temporarily holding the plate 73 stationary will cause the pintles at the ends of the plate 70 to ride upward in the slots 71 and open the jaws formed by these two plates. A reverse movement of the plate 70 causes the jaws to close and grip the wrapping strip completely across its length. The reciprocation of the paper-feeding means, represented by the grippers 63 and plates 70—73, is effected by connecting the lower sliding brackets 65 by rods 74 with the ends of the levers 9, Fig. 1, the levers 9 serving to operate both the carrier 2 and the paper-feeding means.

Figure 5:
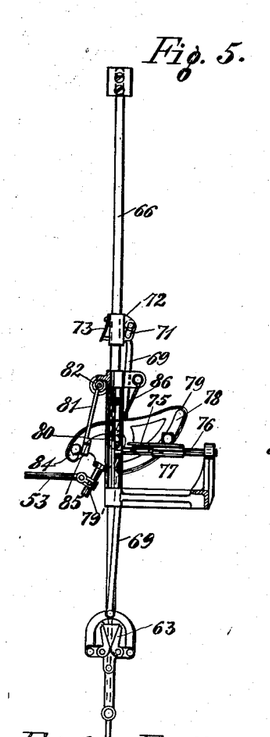
Fig. 5 is a side elevation of the same and showing the cutter.
Figure 5A:
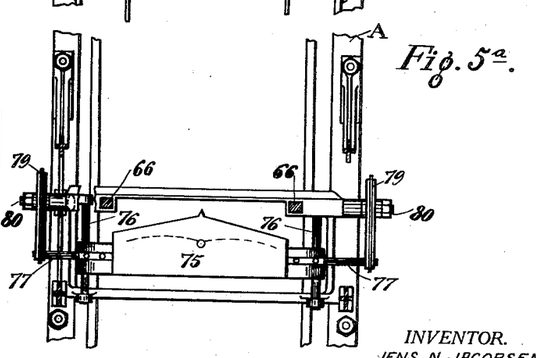
Figures 6, 7:
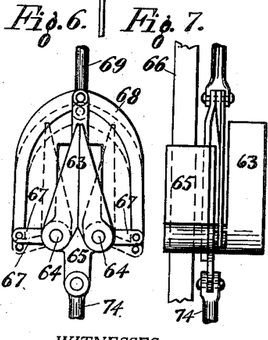
Fig. 6 is a detail of the paper grip.
Fig. 7 is a side view of the same.

At the moment that the paper-feeding mechanism reaches the lowest point of its travel and has operated to draw the lower end of the sheet of paper across the pocket, the cutting mechanism, represented in Figs. 5—5ª is operated. This cutting mechanism consists of a knife 75 preferably made widest at the middle, as shown, and mounted to slide transversely of the wrapping strip 60 on suitable guides 76 on a fixed part of the frame. The ends of the knife have projections 77 operating in slots 78 of cam 79. There is preferably one of these cams at each side of the machine, and these cams are mounted to oscillate on suitable pivots 80. The cam slots 78 are so disposed that when the cams 79 are rocked in one direction the knife will be moved outward from the wrapping strip 60, and when rocked in the opposite direction the knife will be moved to sever the strip. At the same time that the knife is moved in against the wrapping material, a plate 81 is brought in toward the knife and against the opposite side of the strip 60 to support the latter during the cutting operations, and to coöperate with the knife as a cutting member. This plate 81 is pivoted at 82 to the frame above the knife, and it has pintles 83 operating in the cam slots 84 in the cams 79. The arrangement of these cam slots 78—84 is such that the plate and knife will coöperate in the proper manner to open and close, according to the direction in which the cams 79 are rocked; the plate 81 having a lengthwise extending slot 85 at its lower edge to accommodate the knife, and an edge of the slot and the knife coacting shears-fashion.

Figures 20, 21, 21A:
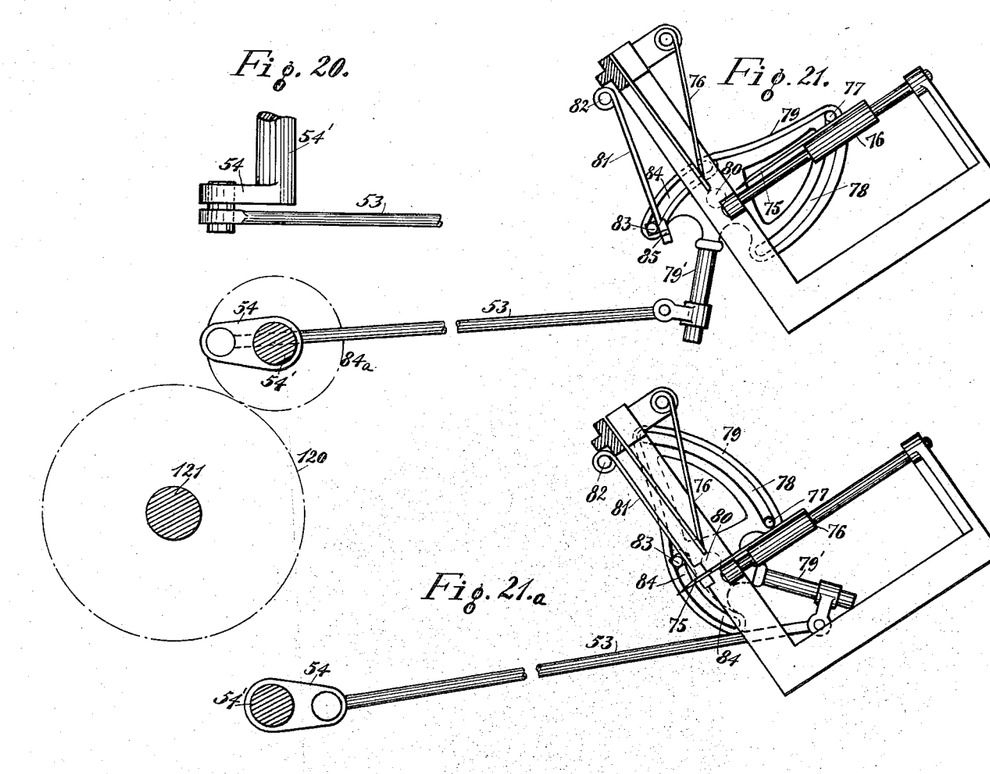
Fig 20 is a detail of part of the mechanism shown in Fig. 21.
Fig. 21 is a detail of the knife-operating means, with knife open.

The oscillation of the cams is effected by the following means: Each cam has a crank arm projection 79' connected by a link 53 with a crank 54 at the end of a shaft 54', Figs. 21, 21ª. Shaft 54' carries a pinion 54ª adapted to mesh intermittently with a mutilated gear 120 on shaft 121. Shaft 121 in turn carries a pinion 122 intermittently meshing a mutilated gear 123 on shaft 18. The manner of timing the operation of these several shafts 54'—121—18 will be more particularly referred to hereinafter. Suffice it to say at the present that the shaft 18 is revolved continuously, and that shaft 121 makes one complete revolution during a half of a revolution of shaft 18 and remains quiet during the other half of the revolution of shaft 18, while the shaft 54' makes one half of a revolution during the revolution of shaft 121 and remains quiet during the revolution of the other half of shaft 121; the several gears 54ª—120 and 122—123 being properly proportioned, so that shaft 54', which operates the knife, will make one complete revolution in one-half the time that shaft 121 does, and one-quarter of the time that shaft 18 does.

Just below the lowest point of travel of the grippers 70—73, and just above the knife, is a yieldingly-mounted plate 86 which is adapted to bear lightly against the paper drawn through the knife and hold the lower edge of the unsevered portion of the paper even and straight and in proper position, so that when the paper-gripping means are raised upward again to draw down a fresh section of wrapping material, the grippers 63 will be sure to engage the lower end of the wrapping strip.

The drawing down of a strip of wrapping material across a pocket, and the cutting off of a section of the desired length, take place during the movement of the butter carrier 38 between the conveyer 2 and the pocket 23, and is so timed that the cube of butter moves a sheet of paper into the pocket, thereby forming the initial fold of the paper about three sides of the cube.

Figures 16, 17, 18, 19:
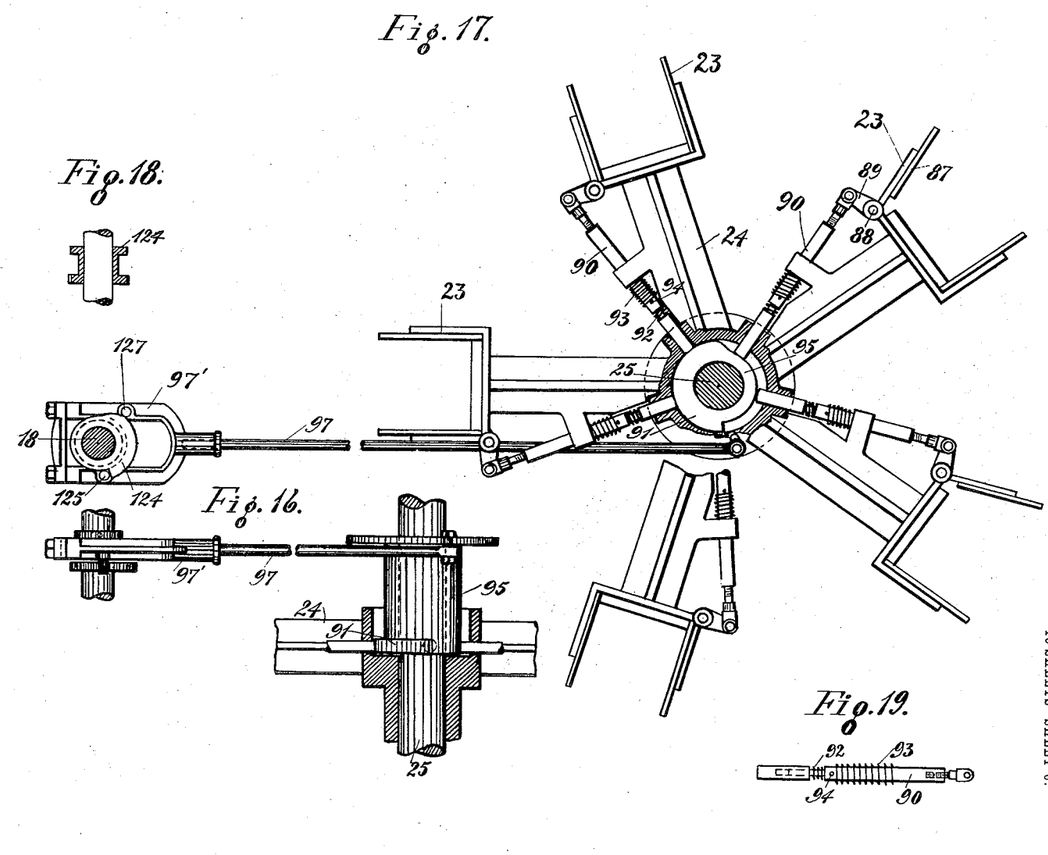
Fig. 16 is a plan in partial section of the wheel and pockets.
Fig. 17 is an elevation in partial section of the same.
Fig. 18 is a detail of the operating cam of Fig. 16.
Fig. 19 is a detail of an arm for operating the movable side of a pocket.

As soon as the material to be wrapped and the wrapper are placed in the receiving pocket, the latter is closed to grip the material and hold it securely until the same has been finally wrapped and is ready for discharge from the machine. As shown in Fig. 17, each pocket has one side, as 87, hinged at its inner angles, as at 88, and provided with a crank arm extension 89. Each crank arm 89 is connected by a rod 90 which extends in through the periphery of the wheel and through the hub, with the inner end of the rod 90 running over a cam sleeve 91. As shown in Fig. 19, each rod 90 is preferably made in sections, with one section telescoping inside of another, with a spring 92 disposed between the sections. A spring 93 is adapted to bear against the rim of the wheel 24 and against a pin 94 on rod 90, and to exert a tendency always to open the pockets. The object of making the rods 90 in two telescoping sections, as shown, is to provide a yielding connection for the hinged side 87, so that this side 87 and the pocket may adapt themselves to cubes varying slightly in size, and thereby prevent injury to the cubes. The cam sleeve 91 fits within the hub of the wheel 24, and has a cut-away portion 95 extending a portion of the way around its periphery, and into which cut-away portion the inner end of the rod 90 will periodically drop, thereby opening out the hinged side 87 and allowing the package either to be received into the pocket, or delivered therefrom. The cam sleeve 91 has a limited rocking motion on the stationary shaft 25, and within the hub of the wheel, and independently of the wheel, for the purpose of opening and closing the pocket during the periods of rest of the wheel, for the purpose of receiving a fresh package and delivering a completed one. This independent rocking motion of the cam sleeve 91 is effected by a rod 97 having a yoke 97' operated by a cam 124 of shaft 18. Cam 124 has a shoulder adapted, during a part of its revolution to engage a pin 125 on the lower fork of the yoke 97' to shift the rod 97 in one direction; and during a succeeding part of the same revolution of shaft 18, this shoulder on the cam will engage another pin 126 on the upper arm of the yoke and shift the rod 97, and correspondingly rock the cam sleeve 91 in the opposite direction. It is understood that the motion of the cam sleeve 91 need be very slight in either direction, and takes place during only a fraction of a revolution of shaft 18. Consequently, when rod 50 is moved to retract the slide carrier 38 upward after depositing a square of butter into the pocket, the cam sleeve 91 is rocked so as to push out the rod 90 belonging to the side 87 of the pocket which has just received the fresh package of material, and close the pocket, and thereby grip the material and wrapper therein. As soon as this is done, and before the wheel starts to turn, a folding device, represented in Figs. 8 and 9, is operated to make the first side fold in the wrapper. This side folding means consists of a roller 98 carried by the slides 99 which are operated by links 100 connecting with the arms 101 of a rock shaft 102. The latter has a crank arm 103 connected by a link 104 with a lever 105, which latter is operated by a cam 106 on shaft 18. The roller 98 is normally below the mouth of the pocket and moves approximately tangential thereto, and between the wheel and the previously described wrapper-feeding means; while another roller 107 placed on a fixed part of the frame is arranged on the upper side of the pocket when the latter is stationary, and substantially tangential thereto. The rollers 98 and 107 are normally separated, so as to stand, respectively, below and above the pocket when it is receiving a fresh charge. As soon as the material and the wrapper are put in the pocket, the roller 98 is moved upward to fold over the flap $c$ of the wrapper, Fig. 8, on to the butter. Then the wheel 24 is set in motion and the opposite flap $d$ is carried under the stationary roller 107 and folded over, leaving only the ends of the wrapper to be closed. The rollers 98—107 are each preferably mounted in their bearings so as to be easily removable, as shown in Fig. 10. The wheel 24, with the package thus inclosed on the sides, is turned eventually to bring the package into operative position with the end folding devices 110—111—112 by which the ends of the wrapper are closed and the wrapping operations completed. In the passage of the package and wrapper from initial receiving position in front of the carrier 38, to final folding position in front of the folders 110—111—112, the package passes beneath a curved guard plate 127 which operates to maintain the overlapping side edges of the wrapper closed.

Figure 22:
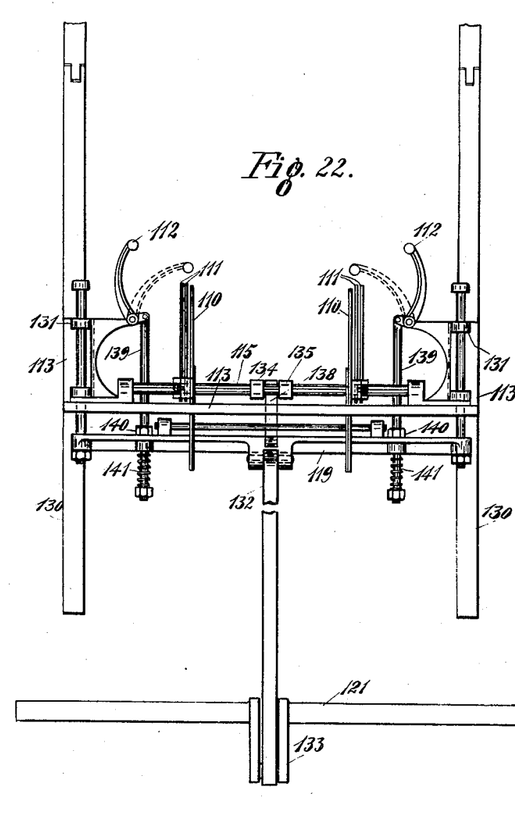
Fig. 22 is a plan of the end-folding mechanism.

The end folders are shown in Figs. 1—22—23—24, and comprise for each end of the wrapper a pair of centrally-disposed pivoted folding blades 110, sidewise folding blades 111, and a folding member 112 operative at right angles to the planes of blades 111—110 These various folding devices are mounted on the carriage 113 fixed to the slides 52, which are connected, as before described, by the rods 50 and crank arms 49 and 47 with the slide carrier 38. A single carriage 113 serves to carry the folders for both ends of the wrapper, as shown in Fig. 22. The blades 110 are pivoted loose on shafts 115 journaled in the frame 113, and these blades have rearwardly extending shanks 116 provided with angularly disposed slots 117. These slots 117 accommodate the pins 118 of a cross-head 119. The cross-head 119 is connected with the carriage so as to have both a movement in unison therewith, and independent thereof, by means of the guide rods 130 sliding in suitable bearings 131 on the carriage 113. The reciprocation of the folding carriage 113 to carry the folding devices into and out of operative engagement with the package, is effected by suitable connections, as the rod 132 connecting with the crank 133 on shaft 121. It is understood that by means of the guides 130, the cross-head 119 has a limited movement toward and from the frame 113 for the purpose of opening and closing the folding devices 110—111, and for operating the folding members 112.

As shown in Figs. 22 to 26, inclusive, the side folders 111 are fixed to the rock shafts 115, and these rock shafts carry the crank arms 134—135, which latter have angular ends with respective cam slots 136; these angular ends being crossed and accommodating a pin 137 carried on the bar 138 projecting forward from and carried by the cross-head 119. The slots 136 in respective arms 134—135 are so disposed that one folder 111 will operate slightly in advance of the other, so as to make a good even fold. The folding members 112 are pivoted to the carriage 113 and have crank arms connecting with the sliding rods 139, which extend back through suitable boxes in the cross-head 119. These rods 139 have suitable stops 140 adapted to bear against the inner side of the cross-head 119, so that when the cross-head 119 is moved toward the carriage 113 these stops 140 will be encountered, and will act to throw the folding members 112 outward and away from each other, as shown in full lines, Fig. 22. The ends of the rods 139 on the opposite side of the cross-head 119 have the springs 141 to provide a suitable yielding connection, so that when the cross-head 119 is moved backward and away from the carriage 113 the folders will be turned toward each other, as shown in dotted lines, Fig. 22.

From the foregoing, it will be understood that when the cross-head 119 and carriage 113 are moved by the rod 132 in toward the wheel 24, the folding devices 111 and 112 are first opened outward by an initial movement of the cross-head 119 toward the carriage 113. The carriage 113 is connected, as before described, by means of the slides 52, the rods 50 and cranks 49 and 47 with the slide carriage 38; and the weight of these parts, in conjunction with the friction devices, Figs. 5 and 14, will prevent too free a movement, such as might otherwise interfere with this necessary independent action of the cross-head 119 with the carriage 113. The folding devices 111—112 are opened and the folders 110 closed substantially as shown in Fig. 23, to accommodate the unfolded ends of the wrapper which project from each side of the adjacent pocket 23.

Figure 1:
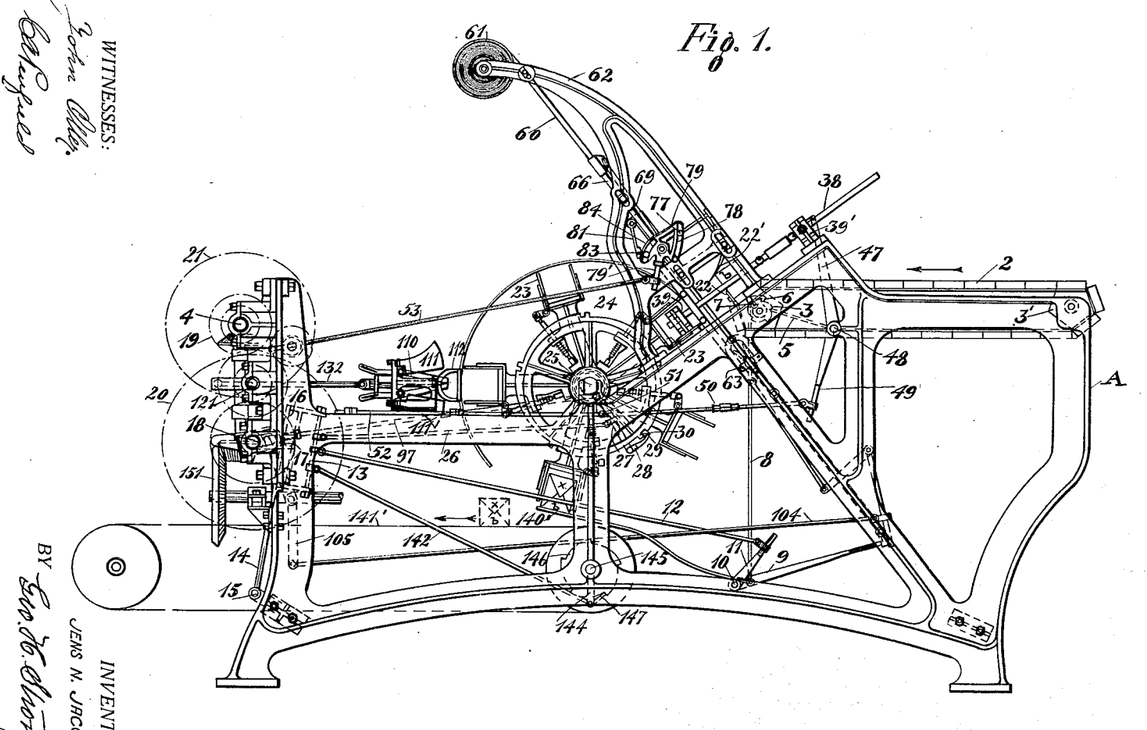
Figure 1 is a side elevation of the machine.
Figure 23:
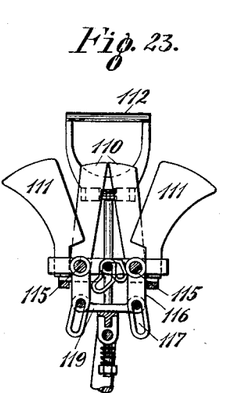
Figs. 23 and 24 are side elevations of an end folder in open and closed positions.
Figure 24:
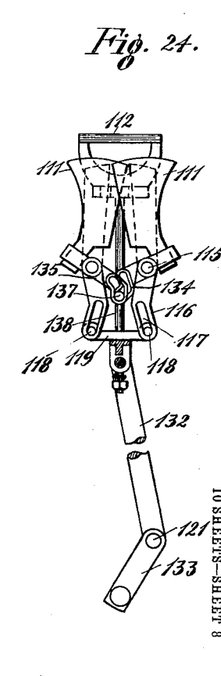
Figure 25:
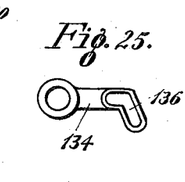
Figs. 25 and 26 are detail views of the actuating cam levers for the side folders.
Figure 26:
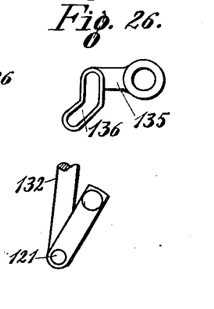

The various steps of folding the end of the wrapper are represented in Figs. 23, 24. As the folders 110 move in across the end of the package, the first fold is made, as shown in Fig. 23. Then when the carriage and cross-head move back away from the wheel, there will be initial independent movement of the cross-head antecedent to the movement of the carriage, which will cause a slight separation of the folders 110, as shown in Fig. 24, for the purpose of giving an even crease to the side folds, which are next made by the closing in of the blades 111. Fig. 1$^b$, $^x$ shows the end of the package immediately after the side folders 111 have acted. As the cross-head and carriage are separated, and the carriage moves away from the pocket, the folders 112 will be turned inward into dotted line position, as shown in Fig. 22, to complete the final folding of the wrapper.

The next step in the revolution of the wheel 24 brings the folded package into the position represented at X, Fig. 1, ready to be discharged from the machine. At the same time it comes into this position X, the cam sleeve 91 is rocked so as to allow the pocket at X to open and deposit the wrapped package on to a pair of arms 140', which are fixed to the rock shaft 10 and move up and down on each side of a suitable conveying belt 141' according as the shaft 10 is rocked. As shown in Fig. 1, these receiving arms 140' are lifted, and are about to receive the completed package at X. On the next movement of the rock shaft 10 these arms 140' will drop down on each side of the conveyer 141' and deposit the package on to the conveyer, whence it will be taken from the machine and delivered wherever desired. Preferably the carrier 141' is given a step by step movement synchronously with the various operations of the rest of the machine by suitable means, as the connecting rod 142 leading to the yoke 13 and connecting with an arm 144 on the shaft 145 which carries one of the rollers over which the conveyer 141' passes. The shaft 145 has a ratchet 146 which is intermittently engaged by a spring-pressed pawl 147 on the suitable actuation of the lever 144.

Figure 2:
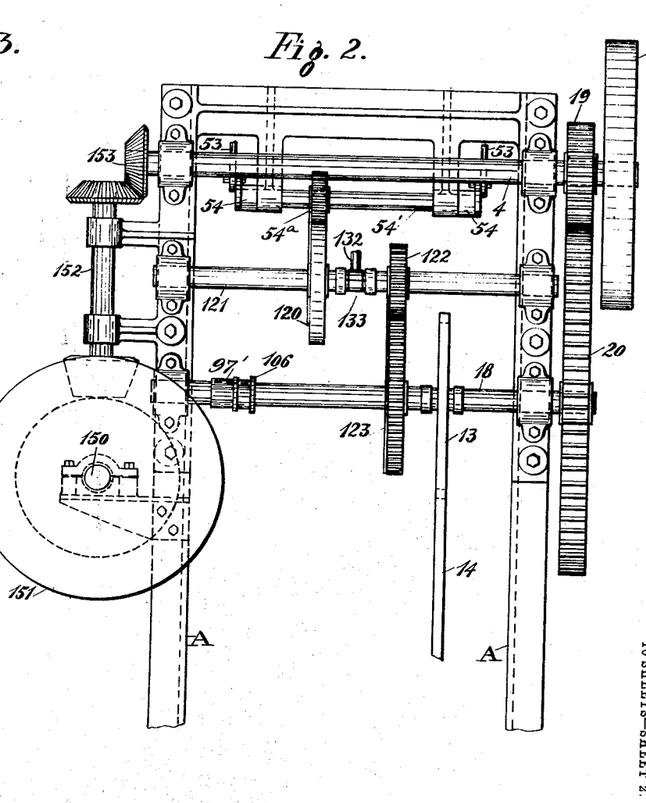
Fig. 2 is an end elevation showing the driving connections.
Figure 3:
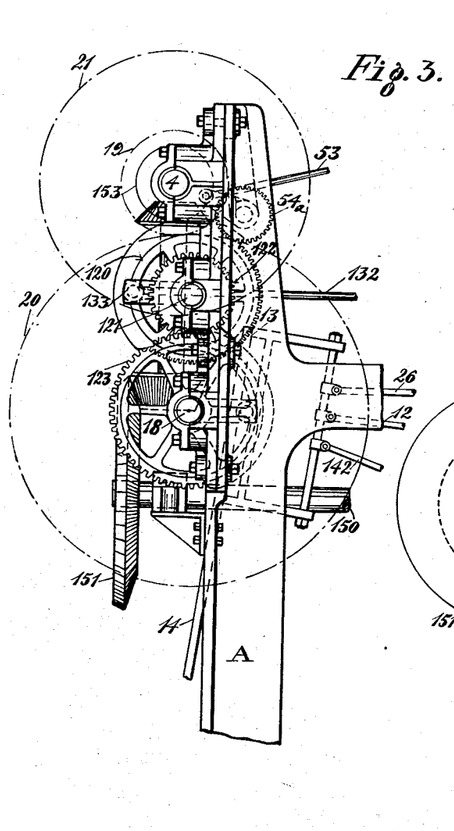
Fig. 3 is a side elevation of part of the mechanism shown in Fig. 2.

In Figs. 1—2—3, I have shown certain shafting and gearing, represented by the characters 150—151—152—153, by which certain mechanism for cutting the butter into suitable cubes may be operated; said cutting mechanism not being here shown, as it forms an independent invention.

Figure 4:
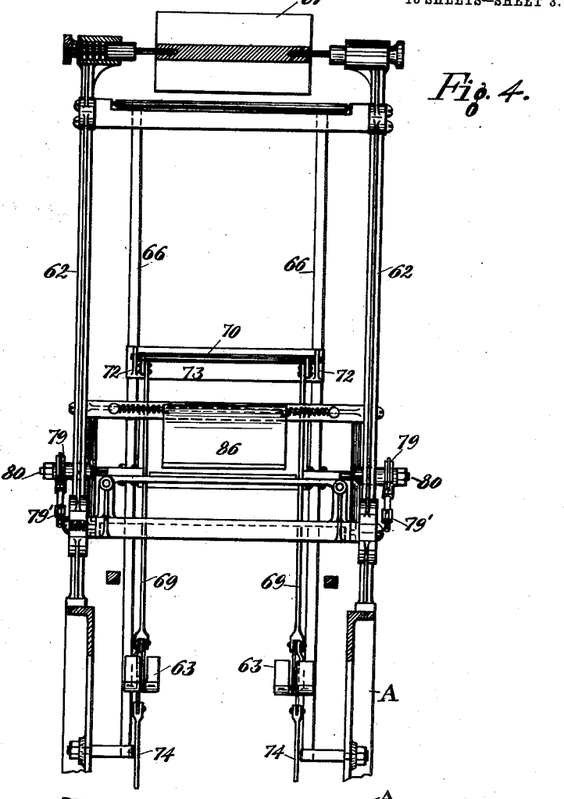
Fig. 4 is a plan view of the paper-feeding mechanism.

In operation, the material, such as butter, cut into suitable shapes of proper dimensions, is fed one article at a time by the conveyer 2 over the forward end of the latter against the normally upright, spring-actuated stop plate 22, and beneath the curved top guide 22'. The slide carrier 38, being in retracted position, the arms 47 are rocked to cause the slide brackets 44 first to move down the side rails of the carrier 38 and close in the grippers 36 against the end of the square of butter. At the time that the arms 47 rock to move the slide carrier 38 downward to carry the butter from the carrier 2 into the pocket 23, which is in position to receive the butter and package, the end folding carriage 113 is moved inward toward the wheel 24 to cause the folding devices 110 to make the initial fold, or the ends of a wrapper which has been brought into position in front of the end folding carriage. Prior to the downward movement of the slide 38 to carry the butter into the pocket, the paper gripping mechanism 63—70—73, shown in Fig. 4, is operated to draw a fresh strip of paper down across the pocket, and the cutting mechanism, shown in Figs. 5, 21, 21$^a$, is operated to sever a strip of material, leaving the severed strip across the mouth of the pocket, and immediately in the path of the approaching square of butter; this strip and the square of butter being carried simultaneously into the pocket. The cam 91 is then turned to close in the side 87 of the receiving pocket, and simultaneously to open the pocket in position X, Fig. 1, and release a previously wrapped package. As soon as the butter, with the wrapper, has been deposited in the pocket by the carrier 38, the connecting rod 132 is reversed to pull back on the end folding carriage 113. This reverse movement of the carriage and cross-head 119 operates, as before described, to actuate the folders 111—112 and make the folds represented by $b$, $x$, in Fig. 1; and at the same time the backward movement of the carriage 113 operates through the slides 52, connecting rod 50, arms 49—47, and shaft 48, to retract the slide carrier 38 upward into initial receiving position. Then the roller folder 98, in Fig. 8, moves upward to fold in the edge $c$ of the wrapper. Next the wheel is turned through the medium of the link 26 and the pawl and ratchet mechanism, shown in Fig. 16, to bring an empty open pocket into line with the slide carrier 38, which is now retracting preparatory to taking a fresh cube of butter from the carrier 2. The turning of the carrier carries the flap $d$, Fig. 8, of the wrapper underneath the stationary roller 107 and closes down the end of the wrapper over the previously folded flap $c$.

With the wrapper thus closed on the sides, the package is moved beneath the segmental guide plate 127, through two successive steps, into operative position in front of the folding devices 110—111—112, when the ends of the wrapper are folded in the manner just described.

While I have shown this wrapping machine as particularly adapted for wrapping rectangular bodies, it is manifest that it is equally applicable to cylindrical and other bodies.

Having thus described my invention, what I claim and desire to secure by Letters Patent is—

1. A wrapping machine having in combination a revoluble wheel having peripheral pockets, closable walls for the pockets hinged at one side thereof, a single rockable cam located substantially at the center of the wheel and independent of the wheel, and radial connections from the hinged walls of the pockets to the cam adapted to be operated to open and close said walls during the periods of rest of the wheel.

2. A wrapping machine having in combination a revoluble wheel having peripheral pockets, hinged sides for the pockets, a single cam at the center of the wheel and rockable independent of the wheel, and radial connections between the cam and the said hinged sides for opening and closing the latter during the periods of rest of the wheel.

3. In a wrapping machine, the combination of a wheel having peripheral pockets, said pockets having a hinged side, and means operative from the center of the wheel for actuating said side to grip or release material in the pocket, said last-named means including a rockable cam at the center of the wheel, yielding connections between the cam and said hinged side, and means for operating said cam independently of the rotation of the wheel.

4. A wrapping machine having in combination a revoluble wheel having peripheral pockets, hinged sides for the pockets, a single cam at the center of the wheel and rockable independent of the wheel, and radial connections between the cam and the said hinged sides for opening and closing the latter during the periods of rest of the wheel, and means for depositing material to be wrapped into said pockets.

5. A wrapping machine having in combination a revoluble wheel having peripheral pockets, hinged sides for the pockets, a single cam at the center of the wheel and rockable independent of the wheel, and radial connections between the cam and the said hinged sides for opening and closing the latter during the period of rest of the wheel, and a slide-carrier having spring-actuated grippers movable toward and from a pocket, for depositing material to be wrapped into the pockets.

6. In a wrapping machine, the combination of a wheel having peripheral pockets, means for giving the wheel a step by step movement, an endless carrier, means for giving said carrier a step by step movement synchronously with the movements of the wheel, a slide carrier operative to carry material to be packaged from said endless carrier into a pocket, said slide carrier having yielding sides with pivotally supported rockable grippers, and means for reciprocating the carriage.

7. In a wrapping machine, the combination of a wheel having peripheral pockets, means for giving the wheel a step by step movement, an endless carrier, means for giving said carrier a step by step movement synchronously with the movements of the wheel, a slide carrier operative to carry material to be packaged from said endless carrier into a pocket, said slide carrier having yielding sides with pivotally supported rockable grippers, and means for operating said grippers to grip the material and for reciprocating said slide.

8. In a wrapping machine, the combination of a wheel having peripheral pockets, an endless carrier for the material to be packaged and a reciprocating slide carrier for conveying material from said endless carrier to said pockets, said slide carrier including spring arms with gripping members movable toward and from each other, and means connected with said slide carrier and acting successively to press the arms together and then to move said slide carrier.

9. In a wrapping machine, the combination with a wheel having peripheral pockets, of a slide carrier to deliver material into said pockets, said slide carrier comprising side bars sliding in suitable guides, inwardly turned spring arms connected with said side bars and carrying movable gripping members movable toward and from each other, and means connected with the side bars and said spring arms to operate successively to press the spring arms together and then to reciprocate the carrier.

10. In a wrapping machine, the combination with a wheel having peripheral pockets, of a slide carrier to deliver material into said pockets, said slide carrier comprising side bars sliding in suitable guides, inwardly turned spring arms connected with said side bars and carrying movable gripping members movable toward and from each other, and means connected with the side bars and said spring arms to operate successively to press the spring arms together and then to reciprocate the carrier, said last-named means including a bracket, stops on one of the side bars between which the bracket has a limited sliding movement, and a link connection between said bracket and one of the spring arms.

11. In a wrapping machine, the combination of a wheel having peripheral pockets, mechanism for delivering material to be wrapped into said pockets, and paper-feeding means operative across the path of said material-feeding mechanism to lay a sheet of paper across a pocket, said paper-feeding means comprising a slide having a double set of gripping members to grip the paper and hold the same across the pocket.

12. In a wrapping machine, the combination of a wheel having peripheral pockets, mechanism for delivering material to be wrapped into said pockets, paper-feeding means operative across the path of said material-feeding mechanism to lay a sheet of paper across a pocket, said paper-feeding means comprising a slide having a double set of gripping members to grip the paper and hold the same across the pocket, one set of said gripping members comprising a pair of plates, one of which is movable toward the other in inclined slots, and a connection between the movable plate and the other set of gripping members for operating both sets in unison.

13. In a wrapping machine, the combination with a package-holder and wrapper-folding mechanism, of means for delivering a package to be wrapped into the holder, and means for feeding a continuous wrapping-strip across the holder and in advance of said package-feeding means, said wrapping-strip feeding means including a reciprocating carrier, said carrier provided with grippers to engage the end of the strip, and with other grippers to engage the strip between the ends of the latter, and cutting means operative between said sets of grippers.

14. In a wrapping machine, the combination of a revoluble wheel having peripheral pockets, means for giving the wheel a step by step movement, a slide carrier for carrying material into a pocket, end-folding mechanism for closing the ends of a wrapper, and connections between said slide carrier and said end-folding mechanism to move the carrier and said folding mechanism simultaneously toward and from the wheel.

15. In a wrapping machine, the combination with a wrapper-holder, of means for closing the end of a wrapper, said means comprising a reciprocating carriage, a pair of hinged blades mounted on the carriage and adapted to fold in one edge of an end of the wrapper, a second pair of blades foldable toward and from each other to fold in the two side flaps of the end of the wrapper, a folding member also mounted on said carriage and operative at right-angles to the planes of the aforesaid pairs of hinged blades, said last-named folding member adapted to fold the remaining end flaps of the wrapper.

16. In a wrapping machine, the combination of a revoluble wheel having peripheral pockets, means for operating the wheel, a slide-carrier for carrying material into a pocket of the wheel, a wrapper holder, means for closing the end of the wrapper, said means comprising a reciprocating carriage, a pair of hinged blades mounted on the carriage and adapted to fold in one edge of an end of the wrapper, a second pair of blades foldable toward and from each other to fold in the two side flaps of the end of the wrapper, a folding member also mounted on said carriage and operative at right angles to the planes of the aforesaid pairs of hinged blades, said last-named folding member adapted to fold the remaining end flap of the wrapper.

17. In a wrapping machine, the combination of a revoluble wheel having peripheral pockets, means for operating the wheel, a slide-carrier for carrying material into a pocket of the wheel, a wrapper holder, means for closing the end of the wrapper, said means comprising a reciprocating carriage, a pair of hinged blades mounted on the carriage and adapted to fold in one edge of an end of the wrapper, a second pair of blades foldable toward and from each other to fold in the two side flaps of the end of the wrapper, a folding member also mounted on said carriage and operative at right-angles to the planes of the aforesaid pairs of hinged blades, said last-named folding member adapted to fold the remaining end flap of the wrapper, and connections between the slide carrier and said end-folding mechanism.

18. In a wrapping machine, the combination with a wrapper-holder, of means for closing the end of a wrapper, said means including a reciprocating carriage, a pair of centrally disposed blades mounted on the carriage, rock shafts on which said blades are loosely pivoted said blades having rearwardly extending angularly-slotted shanks, and a cross-head movable with the carriage having pins engaging the slots in said shanks; a second pair of blades foldable toward and from each other adapted to fold in two side flaps of the end of the wrapper, said second pair of blades being fixed to said shafts, crank arms on the shafts having cam slots, said cross-head carrying a pin which operates in said cam slots, and a folding member operative at right angles to the plane of said folding blades to fold the remaining end flap of the wrapper.

19. In a wrapping machine, the combination of a revoluble wheel having peripheral pockets, means for giving the wheel a step by step movement, a slide carrier for carrying material into a pocket, end-folding mechanism for closing the ends of a wrapper, connections between said slide carrier and said end-folding mechanism to move the carrier and said folding mechanism simultaneously toward and from the wheel, wrapper-feeding mechanism traversing the path of the side carrier to position a wrapper across a pocket, and means for operating said wrapper-feeding means.

In testimony whereof I have hereunto set my hand in presence of two subscribing witnesses.

JENS N. JACOBSEN.

Witnesses:
CHARLES A. PENFIELD,
JESSIE C. BRODIE.